US010358301B2

(12) United States Patent
Lykkegaard et al.

(10) Patent No.: US 10,358,301 B2
(45) Date of Patent: Jul. 23, 2019

(54) METHOD OF DISTRIBUTING AIRPORT BAGGAGE

(71) Applicant: BEUMER Group A/S, Aarhus N (DK)

(72) Inventors: Uffe Lykkegaard, Aarhus C (DK); Anders Bentsen, Viby (DK); Allan Vang Jørgensen, Risskov (DK)

(73) Assignee: Beumer Group A/S, Aarhus N (DK)

( * ) Notice: Subject to any disclaimer, the term of this patent is extended or adjusted under 35 U.S.C. 154(b) by 167 days.

(21) Appl. No.: 14/435,562

(22) PCT Filed: Oct. 31, 2013

(86) PCT No.: PCT/DK2013/050351
§ 371 (c)(1),
(2) Date: Apr. 14, 2015

(87) PCT Pub. No.: WO2014/067530
PCT Pub. Date: May 8, 2014

(65) Prior Publication Data
US 2015/0336753 A1 Nov. 26, 2015

(30) Foreign Application Priority Data

Oct. 31, 2012 (DK) .................................. 2012 70667

(51) Int. Cl.
B65G 57/30 (2006.01)
B64F 1/36 (2017.01)
(Continued)

(52) U.S. Cl.
CPC ............ B65G 57/303 (2013.01); B64F 1/368 (2013.01); B65G 43/00 (2013.01); B65G 47/06 (2013.01);
(Continued)

(58) Field of Classification Search
CPC .. B65G 57/303; B65G 59/062; B65G 59/063; B65G 43/00; B65G 47/06; B65G 47/36;
(Continued)

(56) References Cited

U.S. PATENT DOCUMENTS 3,190,466 A * 6/1965 Hostetier ............. B65G 57/303
414/788.8
3,424,488 A * 1/1969 Renfroe .................... B66C 1/32
294/67.32
(Continued)

FOREIGN PATENT DOCUMENTS

CN 1155501 7/1997
CN 1312935 A 9/2001
(Continued)

OTHER PUBLICATIONS

"GE Infrastructure's Newest Explosives Detection Technology"; Business Wire; Jan. 2005.*
(Continued)

Primary Examiner — Lynn E Schwenning
(74) Attorney, Agent, or Firm — Woodard, Emhardt, Henry, Reeves & Wagner, LLC

(57) ABSTRACT

In order, e.g., to improve distribution of baggage in an airport, a solution comprises positioning two or more empty totes above each other, so that the two or more empty totes are supported by a tote station by support members 206, determining, by a control system, when either a single empty tote should be released from the tote station or two or more empty totes should be released from the tote station together and at once, and in response to the determination releasing single empty totes from the tote station or releasing two or more empty totes on top of each other from the tote station. A lowermost 1604 of the two or more empty totes on top of each other supports one or more empty totes 1606 on top of
(Continued)

it and the lowermost empty tote is, when released, supported by a support conveyor 204.

19 Claims, 11 Drawing Sheets

(51) Int. Cl.
  *B65G 43/00* (2006.01)
  *B65G 47/06* (2006.01)
  *B65G 47/36* (2006.01)
  *B65G 59/06* (2006.01)

(52) U.S. Cl.
  CPC ........... *B65G 47/36* (2013.01); *B65G 59/063* (2013.01); *B65G 2201/0235* (2013.01); *B65G 2203/0208* (2013.01); *B65G 2814/0304* (2013.01); *B65G 2814/0308* (2013.01)

(58) Field of Classification Search
  CPC .... B65G 2201/0235; B65G 2203/0208; B65G 2814/0304; B65G 2814/0308; B64F 1/368
  USPC ............... 414/794.9, 798.1; 221/298
  See application file for complete search history.

(56) References Cited

U.S. PATENT DOCUMENTS

| | | | | |
|---|---|---|---|---|
| 3,558,178 | A * | 1/1971 | Taylor | B66C 1/64 294/192 |
| 3,559,371 | A * | 2/1971 | Borrowman | B65B 23/02 294/81.52 |
| 3,695,462 | A * | 10/1972 | Sullivan | B64F 1/366 198/350 |
| 3,765,546 | A * | 10/1973 | Westerling | B65G 59/062 414/788.7 |
| 3,776,395 | A | 12/1973 | Lingg | |
| 4,043,460 | A * | 8/1977 | Steele | B65G 59/063 414/795.2 |
| 4,234,281 | A * | 11/1980 | Lanham | B65G 1/08 193/35 A |
| 4,249,661 | A * | 2/1981 | Lem | B65G 47/54 198/367 |
| 4,809,881 | A * | 3/1989 | Becker | B65G 59/103 141/172 |
| 4,979,870 | A * | 12/1990 | Mojden | B65G 47/5181 294/87.1 |
| 5,281,080 | A * | 1/1994 | Dale | B65G 60/00 414/788.4 |
| 5,793,639 | A | 8/1998 | Yamazaki | |
| 5,842,555 | A * | 12/1998 | Gannon | B64F 1/368 198/349.5 |
| 5,934,444 | A | 8/1999 | Kierpaul et al. | |
| 6,152,678 | A * | 11/2000 | King | B23Q 7/005 414/749.5 |
| 6,185,272 | B1 * | 2/2001 | Hiraoglu | G01V 5/0008 378/57 |
| 6,276,515 | B1 | 8/2001 | Wayer | |
| 7,021,449 | B2 | 4/2006 | Koini et al. | |
| 7,270,226 | B2 * | 9/2007 | Ostrom | B64F 1/368 198/347.4 |
| 7,353,955 | B2 * | 4/2008 | Edwards | B65G 47/5104 198/348 |
| 2004/0245075 | A1 | 12/2004 | Brixius | |
| 2005/0193648 | A1 * | 9/2005 | Klein | B64F 1/368 52/174 |
| 2005/0220600 | A1 * | 10/2005 | Baker | B65G 1/04 414/626 |
| 2007/0230656 | A1 * | 10/2007 | Lowes | B64F 1/368 378/57 |
| 2007/0253803 | A1 * | 11/2007 | Gerding | B65G 59/063 414/795.2 |
| 2011/0038702 | A1 * | 2/2011 | Torsten | B65G 57/303 414/795.2 |
| 2012/0219397 | A1 * | 8/2012 | Baker | B65G 1/1373 414/796 |
| 2013/0241712 | A1 * | 9/2013 | Motley, III | G06K 19/0717 340/10.51 |
| 2014/0288697 | A1 * | 9/2014 | Sorensen | B65G 47/945 700/218 |
| 2016/0200527 | A1 * | 7/2016 | Fritzsche | B64F 1/368 414/564 |

FOREIGN PATENT DOCUMENTS

| | | | |
|---|---|---|---|
| CN | 1946608 A | | 4/2007 |
| DE | 2 107 489 | | 9/1972 |
| DE | 10 2009 017 343 A1 | | 10/2010 |
| DE | 10 2009 040 792 A1 | | 3/2011 |
| DE | 20 2012 103 138 U1 | | 10/2012 |
| EP | 0 240 812 A2 | | 10/1987 |
| EP | 0 296 601 A1 | | 12/1988 |
| EP | 1 475 322 A1 | | 11/2004 |
| EP | 1 638 867 B1 | | 5/2008 |
| EP | 2 203 366 B1 | | 6/2012 |
| GB | 2224147 A | | 4/1990 |
| GB | 2468667 A | | 9/2010 |
| WO | WO 99/67160 A1 | | 12/1999 |
| WO | WO 02/06141 A1 | | 1/2002 |
| WO | WO 2005/002999 A1 | | 1/2005 |
| WO | WO 2007/041708 A1 | | 4/2007 |
| WO | WO 2009/098439 A2 | | 8/2009 |
| WO | WO 2011/028136 | * | 3/2011 ............. B65G 1/137 |
| WO | WO 2011/141450 A1 | | 11/2011 |
| WO | WO 2012/022826 A1 | | 2/2012 |
| WO | WO 2012/087137 A1 | | 6/2012 |
| WO | WO 2103/075714 | * | 5/2013 ............. B65G 47/94 |

OTHER PUBLICATIONS

Airport Suppliers "Airport Baggage Handling Systems and Sorting" http://www.airport-suppliers.com/supplier/Crisplant/press_release/Airport_Baggage_Handling_Systems_Sorting_and_RFID_integration_17/.
TGW Stacker—Brochure from 2012.
International Search Report for PCT/DK2013/050351 dated Jul. 10, 2014.
International Search Report for PCT/DK2013/050350 dated May 28, 2014.
Machine, Translation of DE102009040792A1 by Lexis Nexis Total Patent on Nov. 13, 2017.
Machine Translation of DE202012103138U1 by Lexis Nexis Total Patent on Nov. 13, 2017.
Screen Shots in English of VanDer Lande Industries Aena? Tratamiento de Equipajas en el Aeropuerto de Barcelona from <https://www.youtube.com/watch?v=kYlwDLPXoo8> dated Sep. 20, 2017.

* cited by examiner

METHOD OF DISTRIBUTING AIRPORT BAGGAGE

CROSS REFERENCE TO RELATED APPLICATIONS

This application is a U.S. National Phase Application of PCT International Application Number PCT/DK2013/050351, filed on Oct. 31, 2013, designating the United States of America and published in the English language, which is an International Application of and claims the benefit of priority to Danish Patent Application No. PA 2012 70667, filed on Oct. 31, 2012. The disclosures of the above-referenced applications are hereby expressly incorporated by reference in their entireties.

FIELD OF THE INVENTION

The invention relates to distribution of airport baggage in an airport, and in particular to a method of distributing airport baggage in totes in an automated airport baggage distribution system.

BACKGROUND OF THE INVENTION

Automated airport baggage distribution systems can be used for distribution of airport baggage between an airport terminal and one or more areas, possibly close to where aircrafts take off and land. Often, the baggage is checked in at an airport baggage counter in the terminal and distributed by the automated airport baggage distribution system from the terminal to a position where baggage for the same destination can be collected and transported to an aircraft at a gate of the airport.

Often, airports have more than one terminal, e.g. an old and a new or a domestic and an international or comprise 5-15 or more terminals. Such terminals, each with their gates, are often spread across several thousands of square meters.

Distribution of airport baggage between a terminal and a gate at that terminal, or between terminals, or from an aircraft and to a baggage claim carousel at a terminal, often needs to be carried out over distance of several hundreds of meters, or even 5-10 kilometers, within a short period of time, such as e.g. 10-30-45 minutes.

Thus, the distribution of baggage is often provided at elevated speeds, such as 1-10 m/s or 2-10 m/s, in order to distribute the baggage within a short period of time. In order to assure a hassle free distribution of various types of baggage at such speeds, the baggage is often positioned in dedicated transport units, often referred to as totes.

Such automated airport baggage distribution systems often comprise a number of consecutive belt conveyor sections capable of running independently and placed in a part of the distribution system, e.g. between check-in stations and a baggage destination. At the baggage destination, the piece of baggage is to be discharged from the automated airport baggage distribution system.

Typically, new, as well as existing, systems experience disadvantages related to their capacity, cost and/or a transit time and/or a transport period for a piece of baggage. In particular, for new and existing solutions, improving one of these factors often has a too high and non-beneficial impact on one or more of the other factors.

Thus, it has been appreciated that an improved method of and system for distributing airport baggage, in airport baggage totes, in an automated baggage distribution system in an airport, is of benefit, and in consequence the present invention has been devised.

SUMMARY OF THE INVENTION

It may be seen as an object of the present invention to provide an improved method of and system for distributing airport baggage, in airport baggage totes, in an automated baggage distribution system in an airport.

Preferably, the invention alleviates, mitigates or eliminates one or more of the above or other disadvantages singly or in any combination. In particular, it may be seen as an object of the invention to provide a method and a system which decreases an average transport time for baggage and/or prevents single pieces of baggage of having a transport or transit time, between various locations in the system, which is far longer than an average transport time, at a significantly decreased cost, when compared to reference systems.

Accordingly, there is provided a method of distributing airport baggage, in airport baggage totes, in an automated baggage distribution system in an airport, the method comprising
a) filling a tote with a piece of baggage at an induction,
b) moving the tote with baggage in the baggage distribution system,
c) emptying the tote from baggage at a discharge,
d) determining, by a control system, which of the totes in the baggage distribution system are empty totes,
e) positioning two or more empty totes above each other, so that the two or more empty totes above each other are supported by a tote station by support members, wherein the method further comprises
f) determining, by the control system, when either a single empty tote should be released from the tote station or two or more empty totes should be released from the tote station together and at once, and in response to a determination in step f) carrying out method step g) and i) or method steps h) and j), where method steps g), h), i) and j) comprises:
g) releasing the single empty tote from the tote station, so that the single empty tote, when released, is supported by a support conveyor of the automated baggage distribution system,
h) releasing two or more empty totes from the tote station, so that the two or more empty totes, when released, are supported by the support conveyor,
i) moving the single empty tote in the baggage distribution system,
j) moving the two or more empty totes in the baggage distribution system, where the two or more empty totes are on top of each other when released from the tote station, and so that, when released, a lowermost of the two or more empty totes on top of each other supports one or more empty totes on top of it and so that the lowermost of the two or more empty totes on top of each other is then supported by the support conveyor.

Thus, an improved method of distributing airport baggage, in airport baggage totes, in an automated baggage distribution system in an airport, is provided. It may be seen that the improvement lies in the way the baggage and the empty totes are handled as described in one or more of the method steps a)-j).

In particular, it may be seen as an advantage that the method includes that the tote station is configured to carry out both the method steps e) and g). Thus, the tote station is provided for positioning two or more empty totes above each other, and so that the two or more empty totes above each other are supported by the tote station, and also, and in dependence of the determination in method step f), to release single empty totes in method step g). Thus, method step e) also includes that the tote station, in itself, can be used as a buffer or store for empty totes.

The totes may be released singly as described in method step g) or as two or more on top of each other as described in method step h) and j).

Consequently, the tote station may serve so as to release two or more empty totes on top of each other prior to a storage for storing such empty totes on top of each other, and/or carrying out method step h) prior to transporting the two or more empty totes on top of each other to a section of the baggage distribution system where the totes on top of each other can be released singly, by the same or another tote station, prior to the empty totes being refilled again.

Hereby, it may be found that a unique method and unique automated baggage distribution system is provided, which has been found to decrease the cost of providing a certain transport time between certain locations, possibly and especially during certain peak performance periods. This is found to be due to an improvement of the manner in which the empty totes can be stored, transported and/or retrieved in and from the automated baggage distribution system, using the method and system as described herein.

It is to be understood that the totes may be positioned above each other or on top of each other as long as they are supported by the tote station in method step e), but that two or more totes to be released together in method step h), at the latest, will be supported on top of each other when released.

Herein it is to be understood that totes supported on top of each other, are positioned relatively to each other so that both sides and both ends of each of the totes are flush or substantially flush with each other.

Preferably, the determination of which totes are empty totes in method step d) is a determination of which totes are single empty totes. Further, the determination is preferably a determination of which totes at or near the tote station are empty. Such determination can be provided by equipment, such as photocells, cameras and/or, e.g., just by the control system knowing that certain totes after emptying are conveyed to certain conveyor lines.

Possibly, the tote station only enables a limited number of empty totes to be positioned above each other in method step e). Alternatively or additionally only a limited number of totes are released and moved on top of each other in method step h) and j).

An embodiment of the invention of carrying out method step e) includes that a first empty tote is supported by the support members of the tote station at a level so that a second empty tote is able to be positioned below the first empty tote, and method step e) includes that the first empty tote is then lowered and released from being supported by the support members and so as to be supported by the second empty tote, and so that the first and second totes are then supported by the support conveyor of the automated baggage distribution system. Hereby a particularly simple method and corresponding equipment is provided.

This also makes it possible that the second empty tote can be moved so that both the first and second empty totes are hereafter supported by the tote station.

In particular, the method and equipment can be provided so that the movement of the first and second empty totes comprises lifting the second empty tote, in order to simplify the system while increasing the capacity and preventing use of additional footprint due to the tote station, in that hereby the empty totes can be positioned above each other and above the area used by the support conveyor.

Particularly, the solution can possibly be further improved when the movement of the first and second empty totes consists of lifting the second empty tote. If, e.g., three, four, five, six or more totes were to be positioned at or in the tote station, the lowermost of these totes would be the one to lift, in order to lift the one, two, three, four, five or more totes on top of it, i.e. the tote to be lifted would be the third or the fourth tote or any number of tote in dependence of the number of totes.

This is different from an alternative solution of e.g., lifting each of the totes individually, which individual lifting may, e.g. be provided by having multiple individually controllable groups or sets of two or more support members, which may increase flexibility and possibly speed, but which may be found to increase the complexity and cost of the solution. But, in such alternative way it would be possible to position the totes above each other, and not necessarily on top of each other, if or when this is to be preferred.

According to an embodiment of the invention, lifting the totes, such as the second empty tote, is carried out with two or more, such as four, support members, which are each engaged at an engagement surface of the second empty tote. This has, e.g., proven more reliable than other solutions. In accordance with embodiments of the solution, the engagement surface is a surface which is accessible for the support member when the tote is supported by a conveyor or supported by another tote and/or when the tote to be engaged with is positioned in between totes on top of each other.

In accordance with further embodiments, engagement of the two or more support members with the tote comprises the support members moving into engagement with the tote in a second direction, the first and second directions being different. The second direction is comprised in a plane which plane is perpendicular to gravity or substantially perpendicular to gravity.

Particularly, it has been found that a simple, cost efficient and reliable method and corresponding system can be provided when engagement with the tote is provided by four support members. In accordance with an embodiment of the solution, the second direction is also transverse or substantially transverse to a forward or backward moving direction of the tote in the distribution system. When this applies, engagement with the tote may possibly be provided by only rotating a support member, e.g. 5-60 or 10-45 or even only 5-15 degrees, whereas engagement with the tote in a direction from an end of the tote, thus substantially parallel with the forward and backward moving direction of the tote, may possibly require larger angular rotations of the support members.

In accordance with embodiments of the solution the two or more support members are provided for engaging an engagement surface provided towards a corner of the tote. In accordance with embodiments of the solution the support members engage with a slanted part of the tote. The slanted part is in accordance with embodiments of the solution provided towards the corner of the tote and towards a bottom of the tote. The slanted part of the tote towards each corner of the tote is included in the tote, in that hereby also improved conveyance of the tote is provided in the automated baggage distribution system, and particularly when the tote moves from one conveyor section to another.

According to another possible embodiment, the tote station includes two or more support members for supporting or releasing at least one empty tote at the tote station and method step(s) e) and/or g) include(s) moving the two or more support members in a first direction parallel with gravity or substantially parallel with gravity and moving the two or more support members in a second direction, which second direction is perpendicular to the first direction or substantially perpendicular to the first direction.

According to another embodiment, method step g) and/or h) further include(s) disengagement of each of two or more support members with a surface of the single empty tote or a surface of a lowermost of the two or more empty totes when the single empty tote or the lowermost of the two or more empty totes is supported by the support conveyor of the automated baggage distribution system.

Preferably and according to various embodiments of the invention, the support conveyor of the automated baggage distribution system maintains its horizontal level and is used as support for one tote or for more totes on top of each other, in the method step(s) e) and/or g). Particularly, the support conveyor can be used as support for one single tote or two or more empty totes on top of each other, during a period when a plurality of support members or catch elements moves in a first direction parallel with gravity or substantially parallel with gravity. The movement of the support members in the first direction correlates to, is equal to or substantially equal to a height of one empty tote when empty totes are supported on top of each other. Hereby a simple, fast and yet reliable solution is provided. This is, among others, due to the support members, e.g., hereby being able to move one or more totes in the tote station while, e.g., a further empty tote enters or leaves the support conveyor. In accordance with embodiments of the solution, the support conveyor maintains its horizontal level during all method steps.

An embodiment of the solution comprises that the tote station only has one group or one set of two or more support members having the same, but moveable, level in a first direction, which first direction is parallel to gravity or substantially parallel to gravity, and that the method comprises moving the two or more support members in the first direction and engaging or disengaging the two or more support members with an empty tote, and using the support conveyor for support of one single empty tote or for support of two or more empty totes on top of each other when the support members are not engaged with a tote and when moving the group of support members between different levels in vertical direction. This is found a cost efficient and still fast solution, when e.g. compared to providing several individual controllable groups or sets of support members at different levels in the vertical direction.

According to an apparatus aspect of the invention an automated baggage distribution system is provided in an airport for distributing airport baggage in airport baggage totes. The system comprises one or more inductions, one or more discharges, one or more tote stations and a control system. At least one tote station is configured to release a single empty tote, so that the single tote, when released, is supported by a support conveyor of the automated baggage distribution system. The at least one tote station is further configured to release two or more empty totes from the tote station together and at once, so that the two or more empty totes, when released, are supported by the support conveyor, and where the two or more empty totes are on top of each other when released from the tote station, and so that, when released, a lowermost of the two or more totes on top of each other supports one or more empty totes on top of it. The system also comprises a number of other conveyors, such as conveyors coupling the mentioned parts of the system.

In accordance with a particular embodiment of the solution, the tote station is configured for being fitted onto an existing conveyor section and the support conveyor is the existing conveyor section. This may be seen as an advantage in that hereby, and in a simple manner, e.g., the capacity, also of existing distribution systems, can be increased and/or transit periods can be reduced.

By referring to an advantage herein, it must be understood that this advantage may be seen as a possible advantage provided by the invention, but it may also be understood that the invention is particularly, but not exclusively, advantageous for obtaining the described advantage.

In general the various aspects and advantages of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
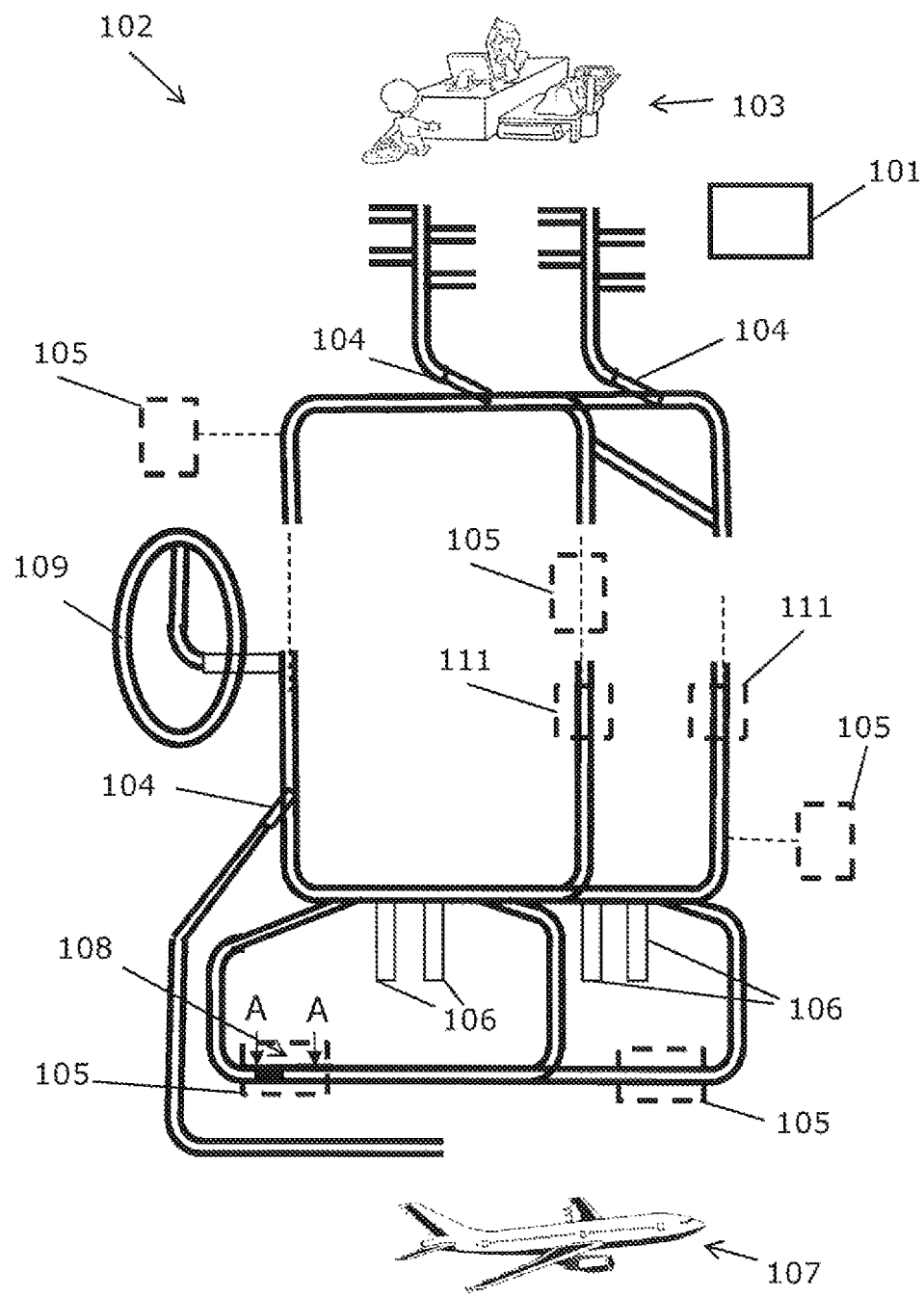
FIG. 1 is a simplified illustration of an automated baggage distribution system.

FIG. 1 is a simplified illustration of an automated baggage distribution system 102 in an airport for distributing airport baggage in airport baggage totes. In a terminal of an airport a piece of baggage is checked in at an airport counter 103 and from here moved by the automated baggage distribution system 102 in order hereby to be loaded into an aircraft 107. Alternatively or additionally the system may handle or distribute baggage from the aircraft 107 and to a baggage claim carousel 109. The illustrated system comprises a number of conveyors, such as belt and/or roller conveyors. The belt conveyors may be split belt conveyors.

The system 102 also includes conveyor elements such as inductions 104, discharges 106 and a control system 101. Such systems may be positioned in one airport terminal or may serve to connect multiple terminals and be installed at each of such terminals. Further such systems may comprise any number of conveyors for multiple check-in counters, multiple baggage claim carousels, multiple inductions, discharges etc.

In particular it is illustrated that at one or more positions a certain configuration 105 including one or more tote stations 108 is/are comprised in the automated baggage distribution system. Such configurations at such illustrative positions are shown with the dashed squares. Each configuration may include one tote station, as will be described for the side view A-A, but each configuration may also include any other number of tote stations 108 and possibly one or more conveyors leading to and/or from the station, as illustrated in FIGS. 19-22. Thus, each configuration may include equipment, such as a number of conveyors for storing totes. The configurations with one or more tote stations 108 is as illustrated provided in, at or on, or operably connected to parts of the automated distribution system 102 where totes, with or without baggage, are handled.

It follows from the figure that a configuration 105, possibly with only one single tote station 108, can be used for carrying out the method step e) for empty totes arriving to the tote station 108 from two or more discharges 106, from one or more storages or from anywhere else in the system, and thus positioning totes above each other, and/or for carrying out the method step g) for totes on top of each other, and thus releasing single empty totes from the tote station, where these single released totes, e.g., are transported to two or more inductions 104, to one or more storages or anywhere else in the system.

Figure 2:
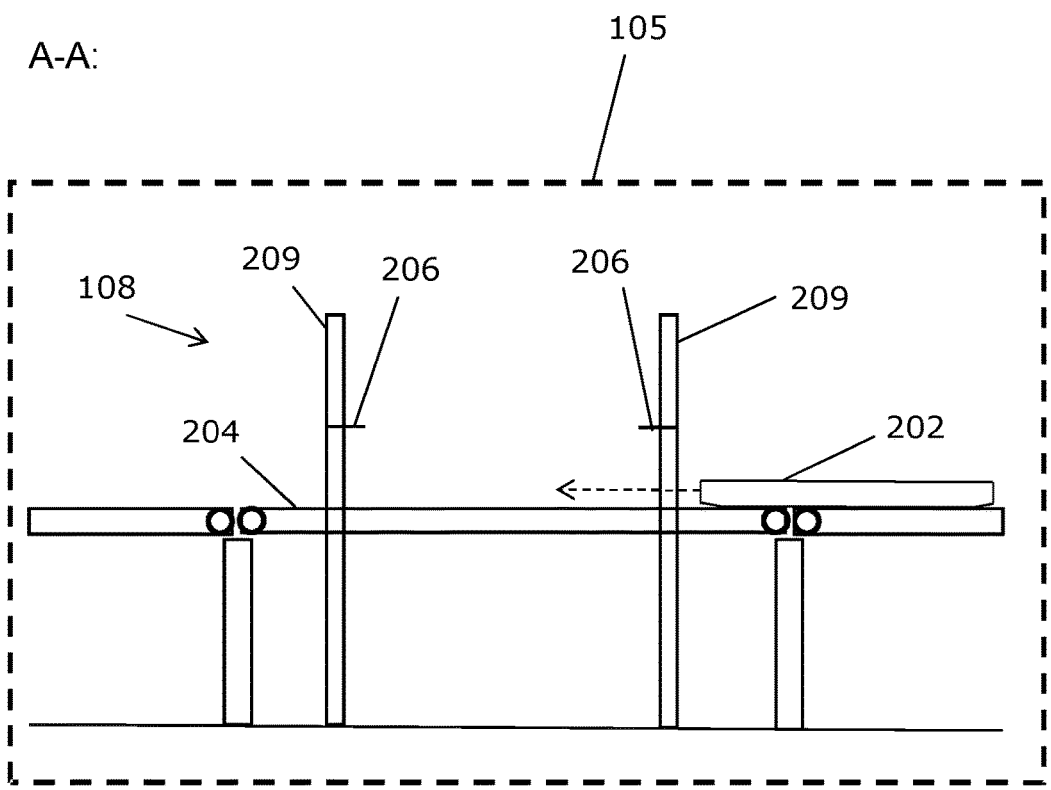
FIG. 2 is a side view of a tote station.

FIG. 2 is the side view A-A as indicated in FIG. 1. It is illustrated that the tote station 108 comprises a support structure, which is illustrated as a number of elongate support structures 209 positioned at a support conveyor 204, which support conveyor is included in the automated distribution system 102. An empty tote 202 is shown moving from right to left towards an area of the support conveyor where the support structure is provided.

In the illustrated embodiment the elongate structures are supported to the floor, but they may additionally or alternatively be fixed to any other support structure, such as, e.g., fixed to side guides (not shown) of the support conveyor 204. The elongate support structures 209 include support members 206. The support members 206 can be moved up or down along the elongate support structure 209 as well as moved so as to engage or disengage with one or more totes on the support conveyor 204 or in the tote station 108. This will be further explained with reference to the following figures.

Figure 3:
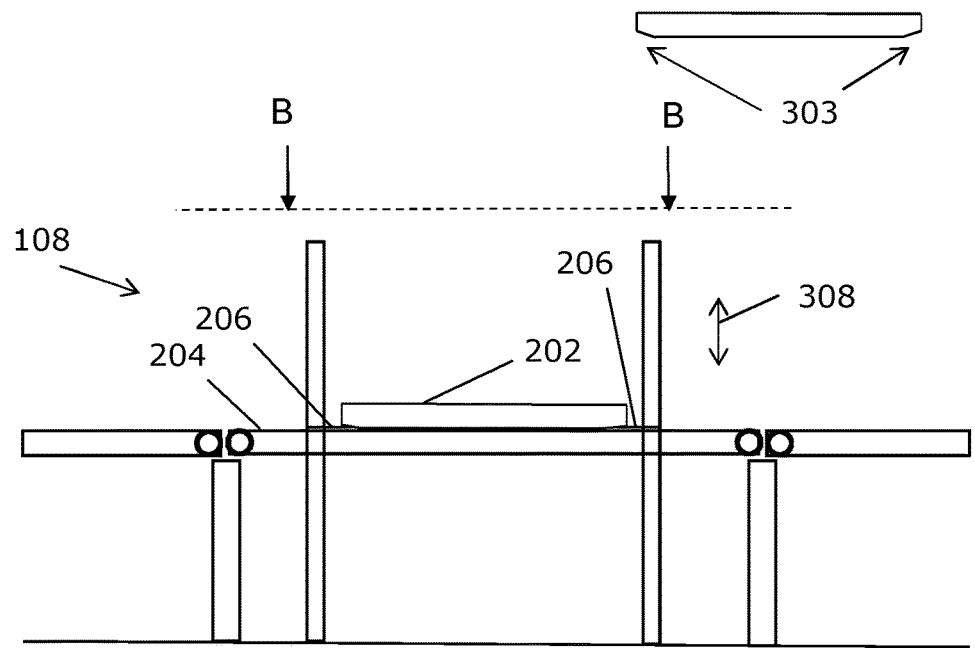
FIG. 3 is the view in FIG. 2, with an empty tote stopped in a certain position on a support conveyor.
Figure 4:
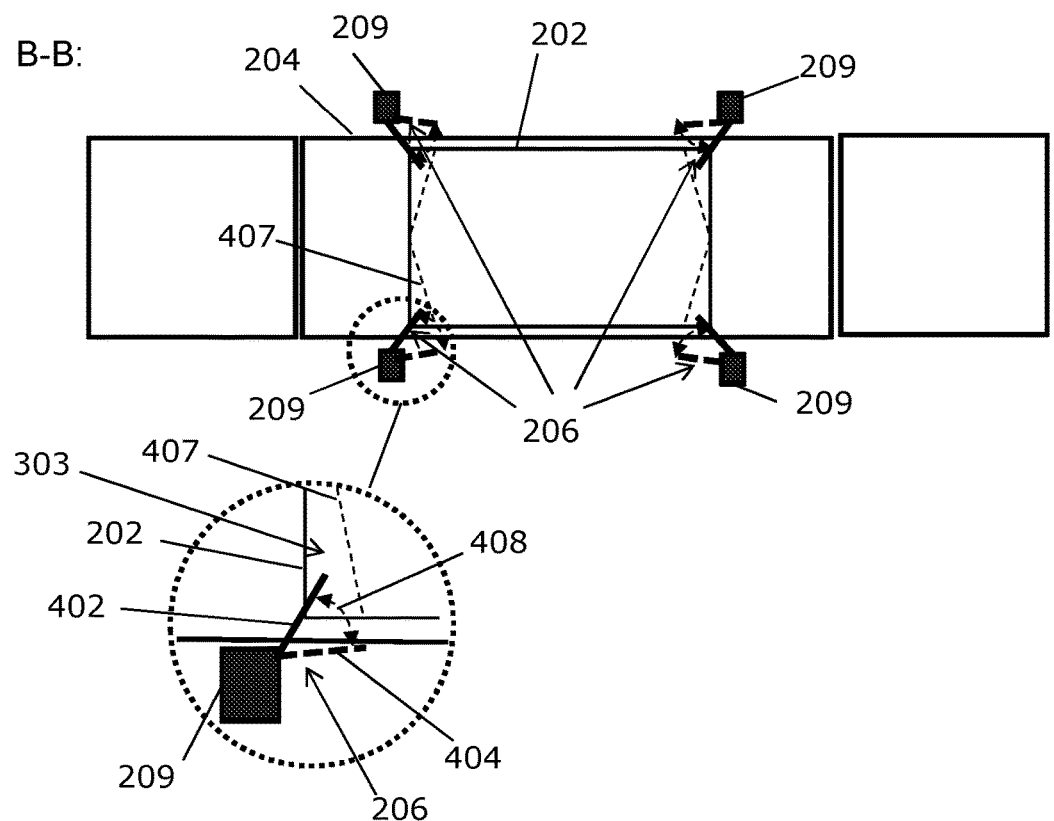
FIG. 4 is a top view of the tote station as illustrated in FIG. 3.

FIG. 3 is the view in FIG. 2, but the empty tote has now been stopped at the tote station on the support conveyor 204, and stopped in a position so that the support members 206 can be moved in a first direction 308 to a level of a lower surface of the empty tote at corners of the tote, as illustrated, for subsequent engagement with the tote, as further illustrated and explained in FIG. 4.

The support members 206 are engaging an engagement surface provided towards a corner of the tote 202. It follows from the figure that the tote is provided with a slanted part 303. The slanted part 303 is provided towards a front end and a rear end of the tote and towards corners of the tote. The slanted part is provided at a bottom of the tote. It follows that the support members are engaged with the tote at such slanted engagement surface of the tote. Using a surface of the slanted part as an engagement surface has proven particularly of benefit. This solution has been chosen over other possible solutions, such as engagement with an alternative engagement surface, possible at a void open space suitable for engagement with the tote. Such alternative engagement surface could, e.g., be a cavity or opening in the surface of the tote along the side and/or ends of the tote.

FIG. 4 is a top view of the tote station as illustrated in FIG. 3. From the figure it follows that four elongate support structures 209 are provided, two elongated support structures on each side of the support conveyor 204. It is illustrated that the support members 206, of which the shown embodiment comprises four, can be moved, in a second direction 408, between an engaged position 402, where the support member 206 is engaged with the tote, and a disengaged position 404. In the shown embodiment the movement of the support members comprises pivoting or rotating the support member between engaged and disengaged positions of the support member. The illustrated rotation is about 40 degrees. Borders towards the slanted part of the tote are illustrated by the dashed lines 407.

Although four support members are shown, the system could, e.g., work with only two support members, e.g., one at each end of the tote, or two at one side of the tote, e.g. one towards or at each end of the tote. When using two at one side, such support members would possibly have to be moved linearly from the side and under the tote, so as to be able to support the tote from the side, which may be unwanted and possibly less preferred than the illustrated solution. It follows that the movement of the support members is a movement in the horizontal plane.

Figure 5:
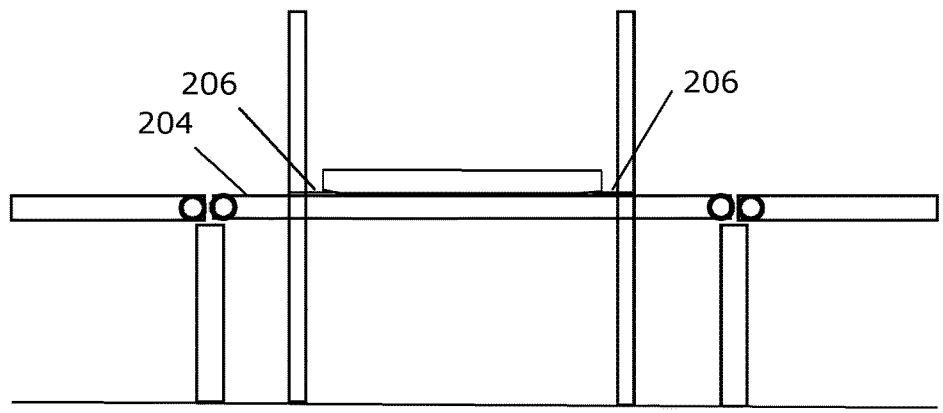
FIG. 5 illustrates a situation where the support members for supporting the tote in the tote station have been moved into an engaged position.

In FIG. 5 the support members 206 have been moved into the engaged position under the empty tote, and thus to a position where the support members extend over a surface of the support conveyor 204, but where the support members are able to engage an engagement surface of the tote and thus to support the tote. Other solutions for engagement with the tote are possible, such as pressing support members towards the tote from both sides of the tote, suction etc.

Figure 6:
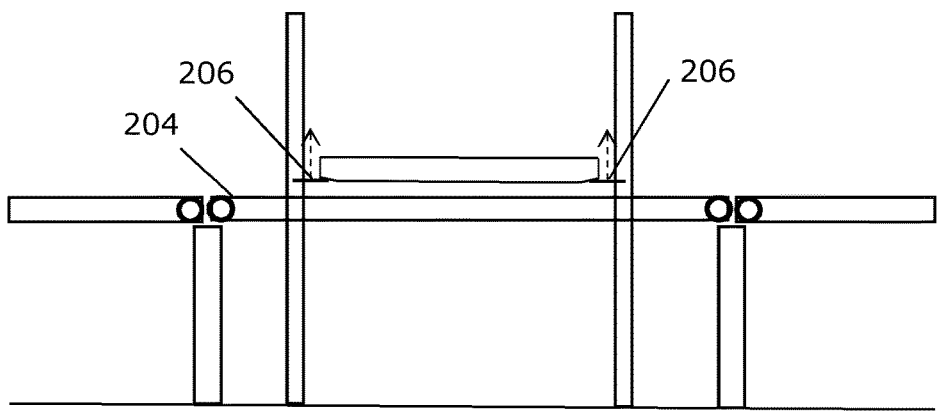
FIG. 6 illustrates the support members lifting the empty tote.

In FIG. 6 the support members 206 are lifting the empty tote so that it is no longer supported by the support conveyor 204, but by the support members of the tote station 108.

In an alternative embodiment of the tote station, system and method as described herein, a plurality, i.e. at least two, three, four or more empty totes on top of each other may be lifted at once from the support conveyor 204 by the support members 206, and hereby be inserted and positioned at once in the tote station 108.

The plurality of empty totes which may be inserted at once, may as an example, have been released as a stack from another tote station. Still further, the plurality of empty totes to be inserted at once, may e.g. be all of the plurality of empty totes stopped at the tote station, or may e.g. be the topmost two totes of e.g. a stack of three, four or five empty totes on top of each other that have been stopped at the tote station 108.

Figure 7:
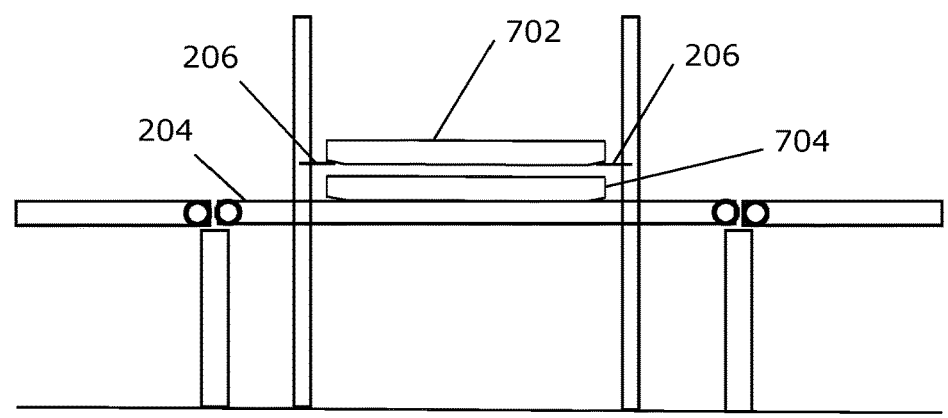
FIG. 7 illustrates a first empty tote supported by the tote station.

FIG. 7 illustrates that a first empty tote 702 is supported by the tote station at a level so that a second empty tote 704 is able to be positioned below the first empty tote 702. It can be seen that the support members only move in the first direction so that an additional and single empty tote is just able to pass or be positioned below. If one or more filled totes or even two or more totes on top of each other, were to pass the tote station, it would be possible to lift one or more totes in the tote station in order for letting such filled tote, or two or more totes on top of each other, pass the tote station via the support conveyor.

With the tote station and system as described herein, one or two empty totes may even be positioned below a tote filled with a, preferably small and/or light, piece of baggage. Then the filled tote on top of the one or more totes would preferably have to be released from a tote station as a single tote prior to discharging its contents.

Figure 8:
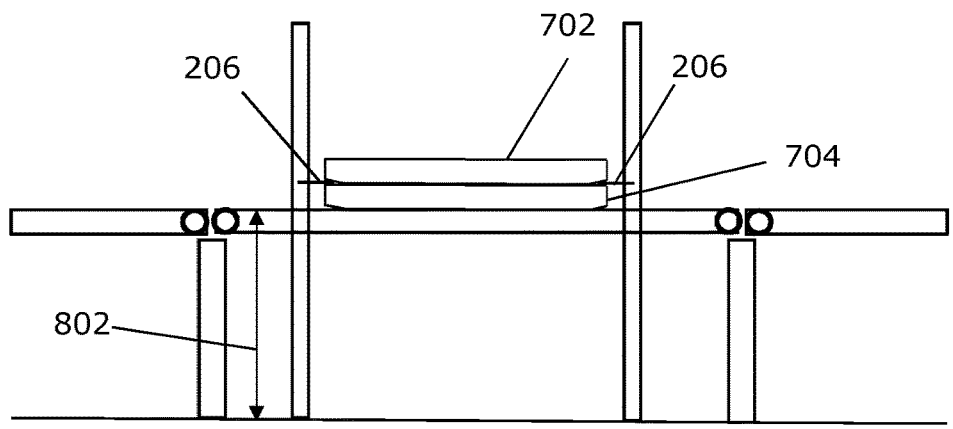
FIG. 8 illustrates a situation after the first empty tote 702 has been lowered.

FIG. 8 illustrates a situation after the first empty tote 702 has been lowered and is about to be released from being supported by the support members 206 of the tote station and so as hereafter to be supported by the second empty tote 704. It is illustrated that the support conveyor 204 of the automated baggage distribution system maintains its horizontal level 802 and is used as support for the one or more empty totes during this operation. As is understood herein, and for the embodiments described herein, it is preferred that the support conveyor maintains its horizontal level during all operations. It may be possible to provide lifting arrangements, such as between split belts of the support conveyor and below the support conveyor, for lifting a lowermost tote and for cooperating with the support members, but such solution is found less preferred than the described embodiments.

Figure 9:
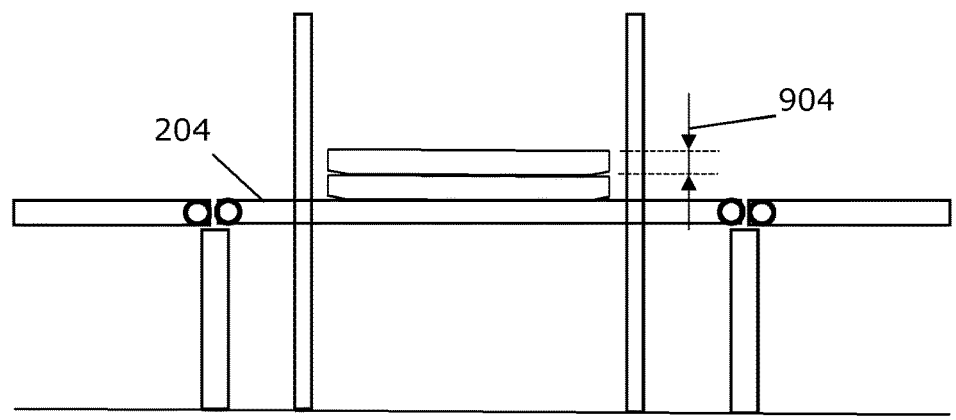
FIG. 9 illustrates a height 904 of one empty tote in a situation when two totes are supported on top of each other.

FIG. 9 illustrates a height 904 of one empty tote in a situation when two totes are supported on top of each other, and in the illustration when supported on top of each other by the support conveyor 204.

Figure 10:
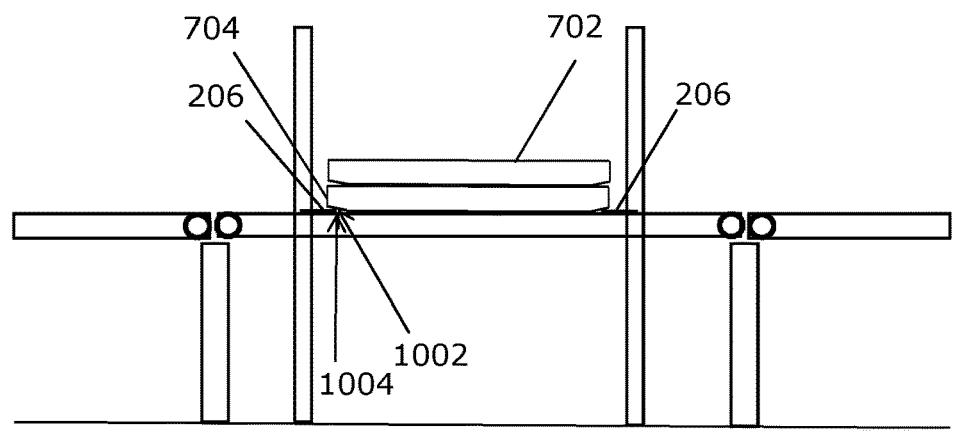
FIG. 10 illustrates a situation where the support members have just been engaged with the second tote 704.

FIG. 10 illustrates a situation where the support members have just been engaged with the second tote 704. This is just prior to lifting the second empty tote 704 with the four support members 206 (of which two are seen in this figure). The support members are each engaged at an engagement surface 1002 at each of four corners 1004 of the second empty tote 704. It is furthermore illustrated that the four support members 206 engage with the engagement surface of the second empty tote by moving into an open space at the corner 1004 of the second empty tote 704 and engaging with a surface in this open space. This follows by a movement of the support members in the second direction 408, illustrated in FIG. 4. The second direction is comprised in a plane which plane is perpendicular with gravity or substantially perpendicular with gravity. In the shown situation the open space is between the corner of the tote and the support conveyor 204. The open space is provided at the slanted part of the tote, possibly refer to FIG. 3.

Figure 11:
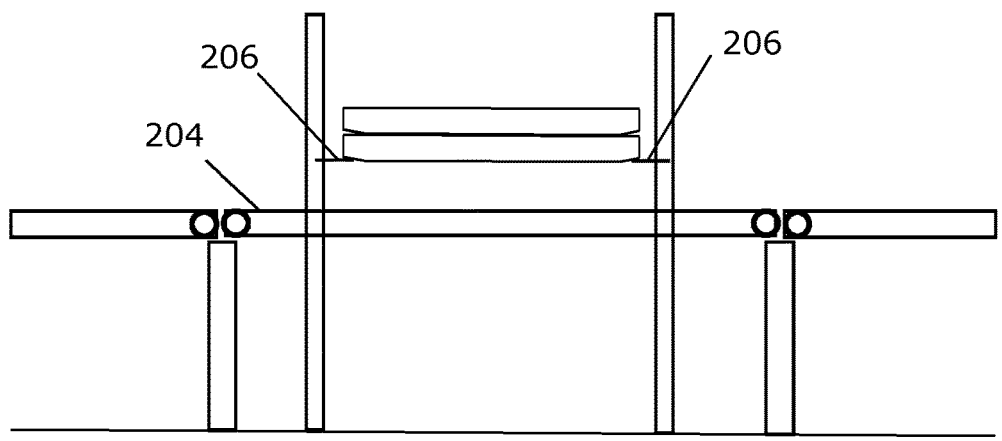
FIG. 11 illustrates a situation after the one in FIG. 10.
Figure 13:
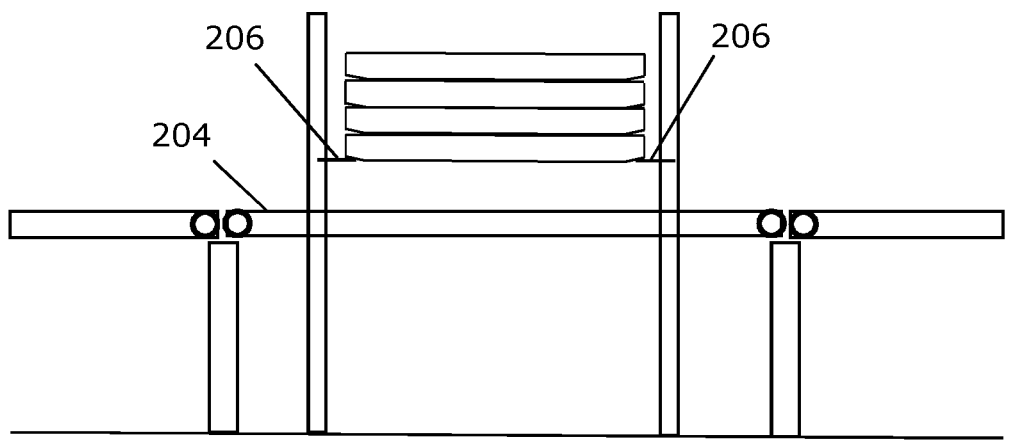
FIG. 13 illustrates that four empty totes are supported on top of each other in the tote station.

FIG. 11 illustrates that after the situation in FIG. 10, the second empty tote 704 is then lifted and so that now both the first and second empty totes are supported by the support members of the tote station. When more than two totes is to be positioned above each other in the tote station, the steps illustrated in the previous figures are carried out until, e.g., a situation as shown in FIG. 13 is reached, where four empty totes are supported on top of each other in the tote station.

Figure 12:
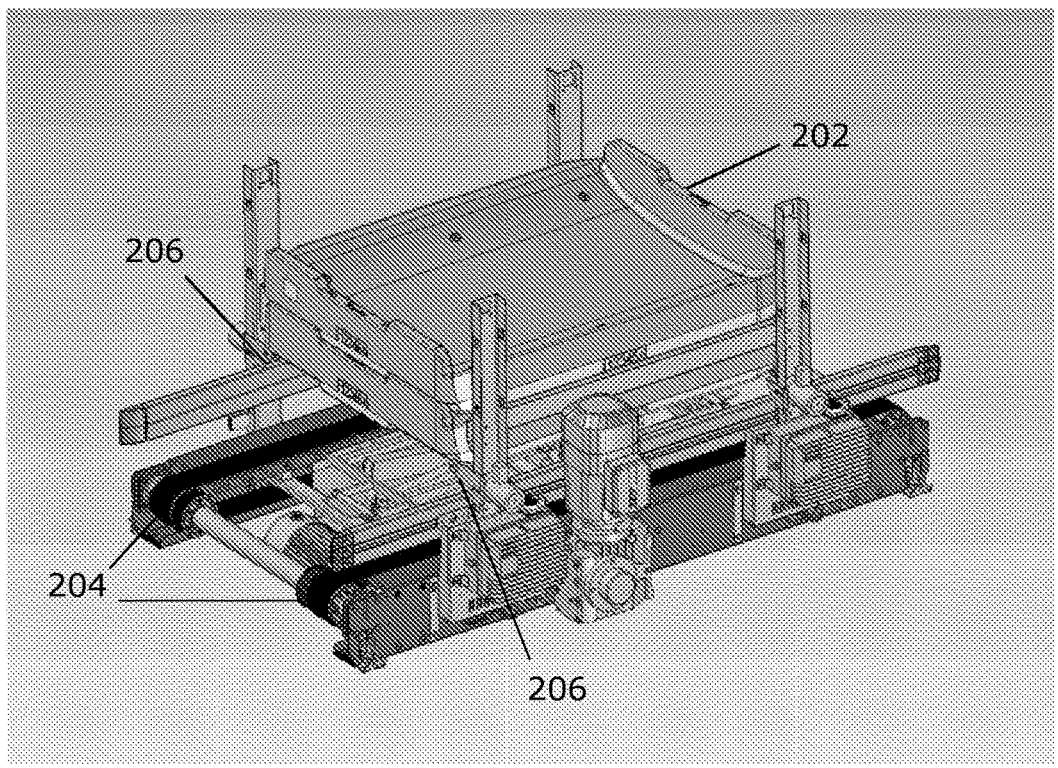
FIG. 12 is a perspective view of the tote station.

FIG. 12 is a perspective view of the tote station in the situation illustrated in FIG. 11. It can be seen that the tote station is fitted onto a conveyor section of the automated baggage distribution system. It follows that the conveyor section is of a kind with split belts, one in each side of the conveyor section. The split belts thus form the supporting conveyor 204. Although some equipment is shown between the belts in the figure, a possible advantage of the solution described herein is that no particular equipment, such as lifting equipment, is necessarily needed between the split belts and/or below the split belts. Even though the tote section is shown fitted onto a straight section, the tote station may additionally or alternatively be positioned along a section of the automated distribution system having an incline and/or decline or a section having a left or right curve in the horizontal plane.

Figure 14:
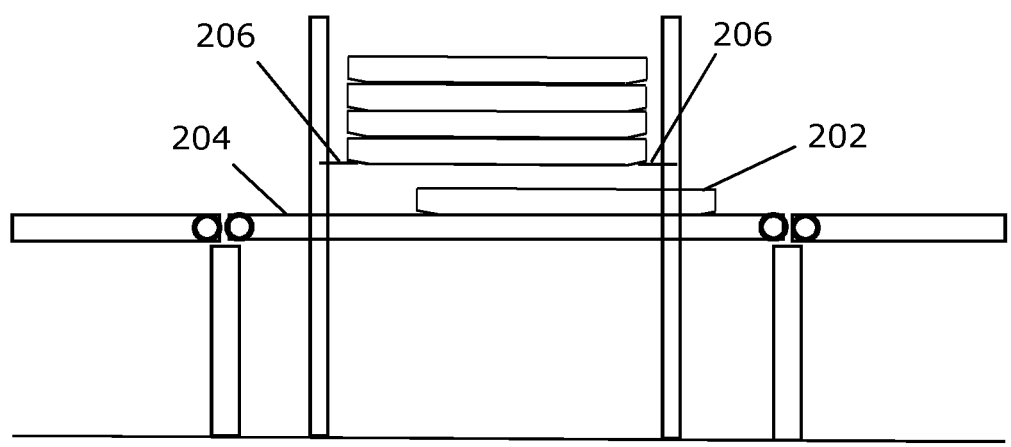
FIG. 14 is related to the number of empty totes in a tote station.

FIG. 14 illustrates an embodiment from where it follows that with the illustrated height of the used totes, when on top of each other in the tote station, not much more than four totes can be positioned in the tote station when an empty tote 202 is able to pass below the totes in the tote station.

For various reasons, such as handling speed, simplicity, reliability and/or space requirements, it may be preferred that the totes and the tote station are provided so that only a limited number of totes, such as two, three, four, five, six, seven, eight, nine, ten or possibly maximum 15 or 20, can be positioned above each other at the tote station. Possibly, a further empty or filled tote is, or is not, prevented from passing the tote station, using the support conveyor, when the tote station comprises such number of totes. Still further, a reason for a certain maximum may alternatively or additionally be due to the size and/or weight and/or stability of such number of totes.

Similarly and possibly in particular, it may be preferred, that only a limited number of empty totes on top of each other, such as two, three, four, five, six, seven, eight, nine, ten or possibly maximum 15 or 20, can be released at once and together from the tote station. This may have various reasons, such as handling speed, simplicity, reliability and/or ability to convey the totes on top of each other and/or due to space requirements.

Figure 15:
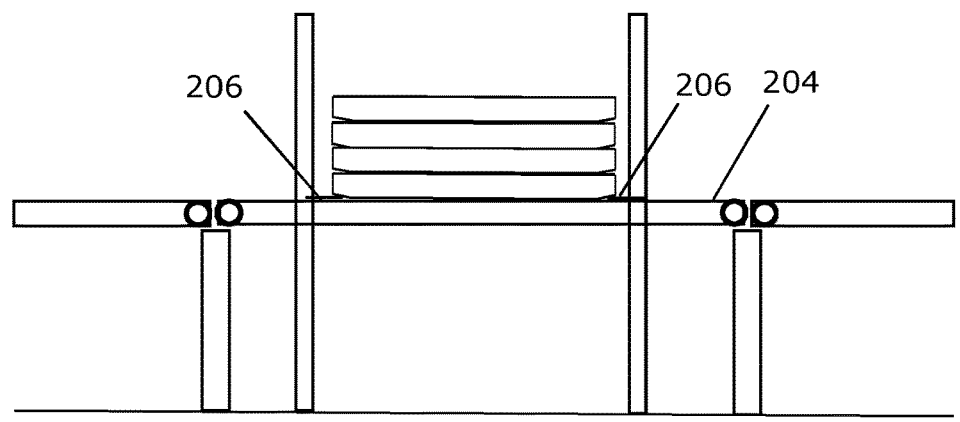
FIG. 15 illustrates a situation where four totes on top of each other are lowered by the support members.
Figure 16:
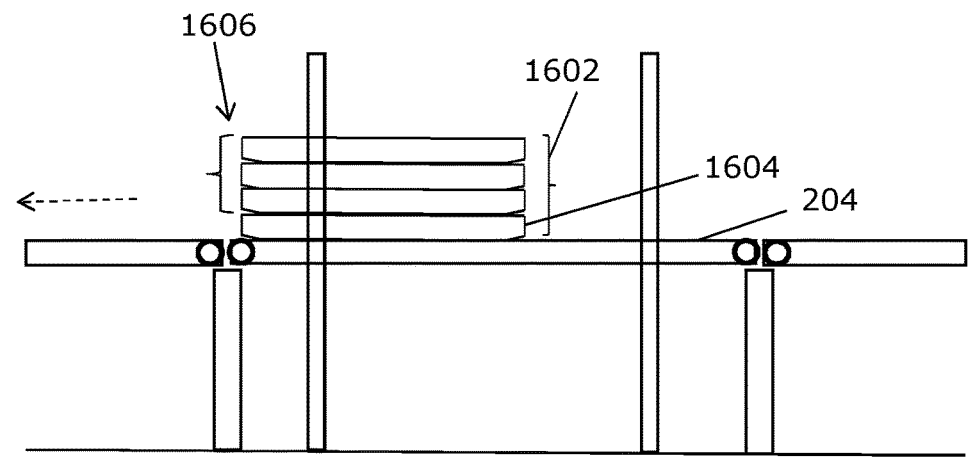
FIG. 16 illustrates method step j)
Figure 17:
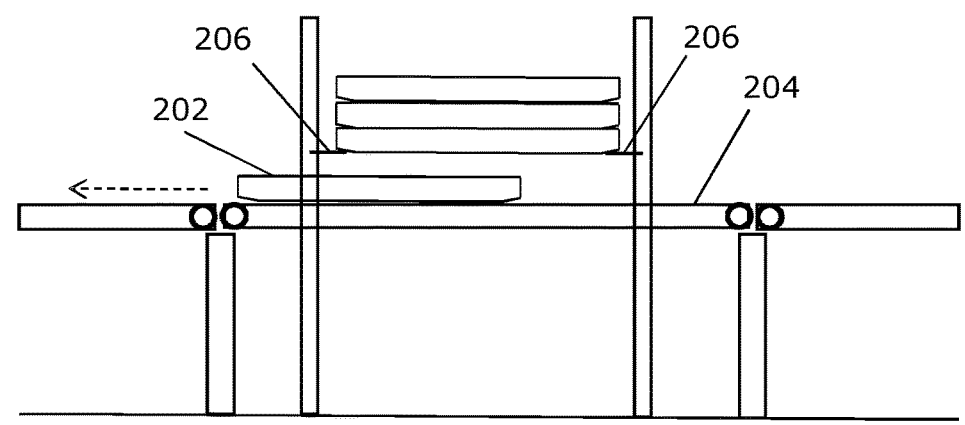
FIG. 17 illustrates that a single empty tote has been released from the tote station.

FIG. 15 illustrates the situation where two or more empty totes, and in the shown example four totes, are lowered by the support members 206, so that the lowermost tote can be supported by the support conveyor 204, and so that either two or more totes on top of each other can be released, refer to FIG. 16, or one single tote can be released, see FIG. 17.

A determination of what to do is provided by a control system (not illustrated), e.g. in dependence of where in the automated distribution system one or more empty totes are needed, or in dependence of if a single tote is needed, e.g. close by the tote station, or if totes on top of each other should be stored as such close to the tote station, or if totes on top of each other can or should be transported, e.g., rather far in the automated distribution system and singled out or stored there. These choices may e.g. depend on which mode the automated distribution system, or parts thereof, are operated.

FIG. 16 illustrates method step j), thus, moving two or more empty totes in the baggage distribution system on top of each other, in the shown example four, when released from the tote station, and so that, when released, a lowermost 1604 of the two or more empty totes on top of each other 1602, supports one or more empty totes 1606, in the shown example three, on top of it and so that the lowermost 1604 of the two or more empty totes on top of each other 1602 is then supported by the support conveyor 204.

In FIG. 17 a single empty tote 202 has been released from the tote station. It is illustrated that it leaves the tote station in the same direction it entered the tote station at first, see FIG. 2, but these directions may or may not be the same. This also applies for two or more totes on top of each other. Still further, it may vary in which direction totes leaves and/or enters the tote station.

Figure 18:
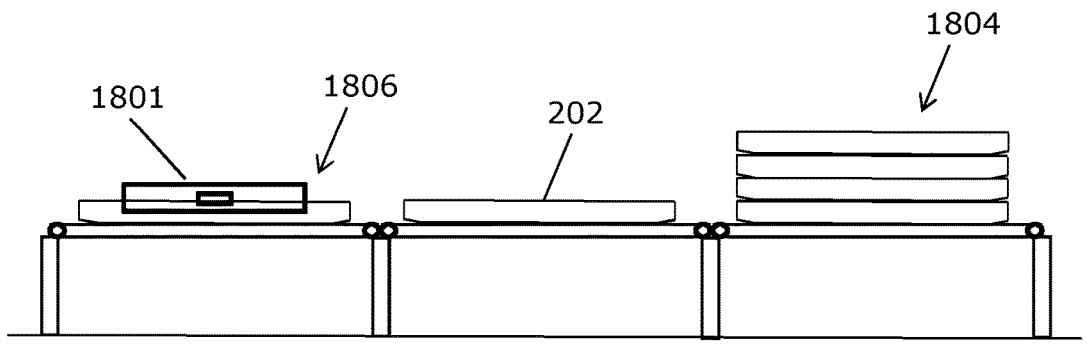
FIG. 18 illustrates that the automated baggage distribution system is handling both single empty totes, totes filled with airport baggage and also two or more totes on top of each other.

FIG. 18 illustrates that the automated baggage distribution system is of a type where both single empty totes 202 and totes 1806 filled with airport baggage 1801 travel in or on the same conveyors of the baggage distribution system and where the conveyors both convey single totes 1806, 202, with or without baggage and also two or more totes on top of each other 1804.

In accordance with embodiments of the solution described herein, the automated baggage distribution system, the totes 202 and the tote station 108 are provided so that either step e), g) or h) can be carried out at a rate of at least 750 totes/hour, preferably with a rate of at least 1000 totes/hour, more preferred at 20 least 1200 totes/hour. Further, one, two or three of the method steps a), b) and c) is/are carried out while moving the empty or filled tote at a speed of at least 0.75 m/s, preferably at least 1 m/s, more preferred at least 1.25 m/s. Still further, the solution may include a tote and any baggage on the tote is X-ray scanned in an X-ray scanning station 111 while any baggage on the tote is carried by the tote through the X-ray station 111 by the automated baggage distribution system.

Figure 19:
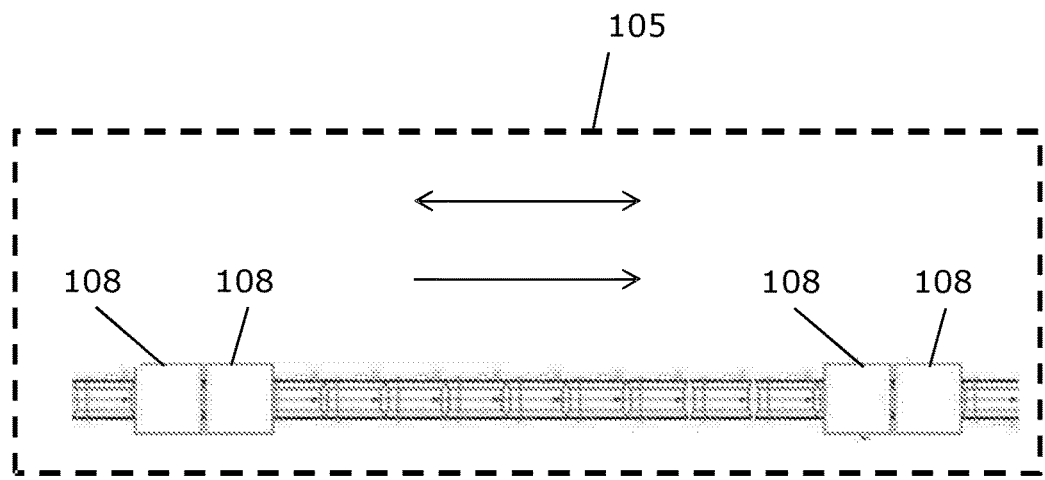
FIGS. 19-22 show various configurations of tote station and storage solutions.

FIGS. 19-22 illustrate various configurations 105 of how tote stations 108 can be positioned, implemented and used in the automated baggage distribution system. In FIG. 19 two tote stations are positioned in-line and following each other and then on the same conveyor line, two additional positioned tote stations are placed in the same way. The arrows next to the conveyor line illustrate the direction in which single totes and/or two or more totes may or may not enter or leave one or more of the tote stations. This applies for all the configurations 105 including one or more tote stations herein.

Figure 20:
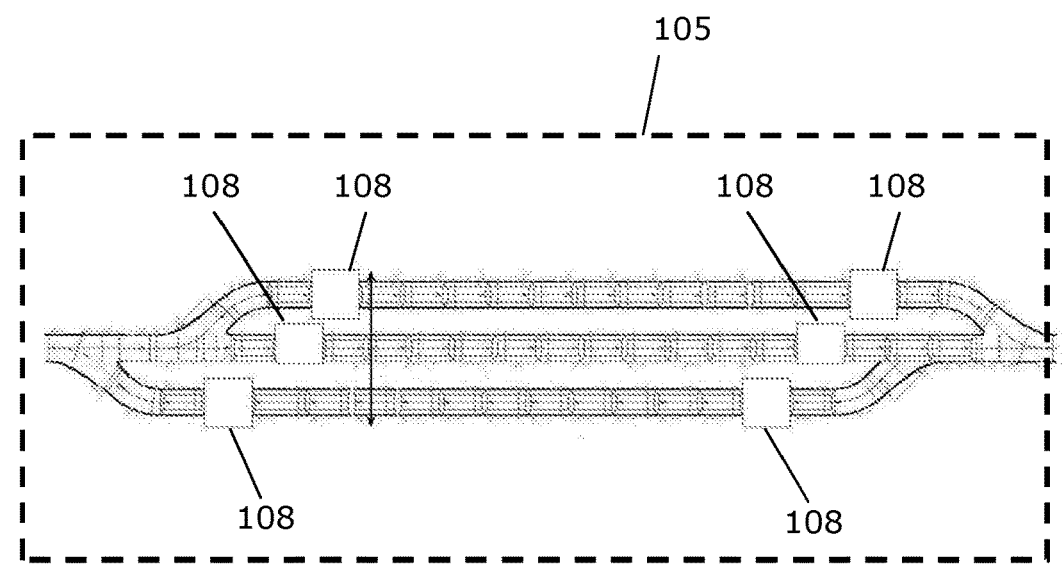

FIG. 20 illustrates a configuration of a part of the automated distribution system where a single conveyor line splits out into three parallel conveyor lines. This is illustrated with the two-way arrow crossing the three conveyor lines. Each of the three conveyor lines is equipped with a tote station 108 at each end of the conveyor line.

Figure 21:
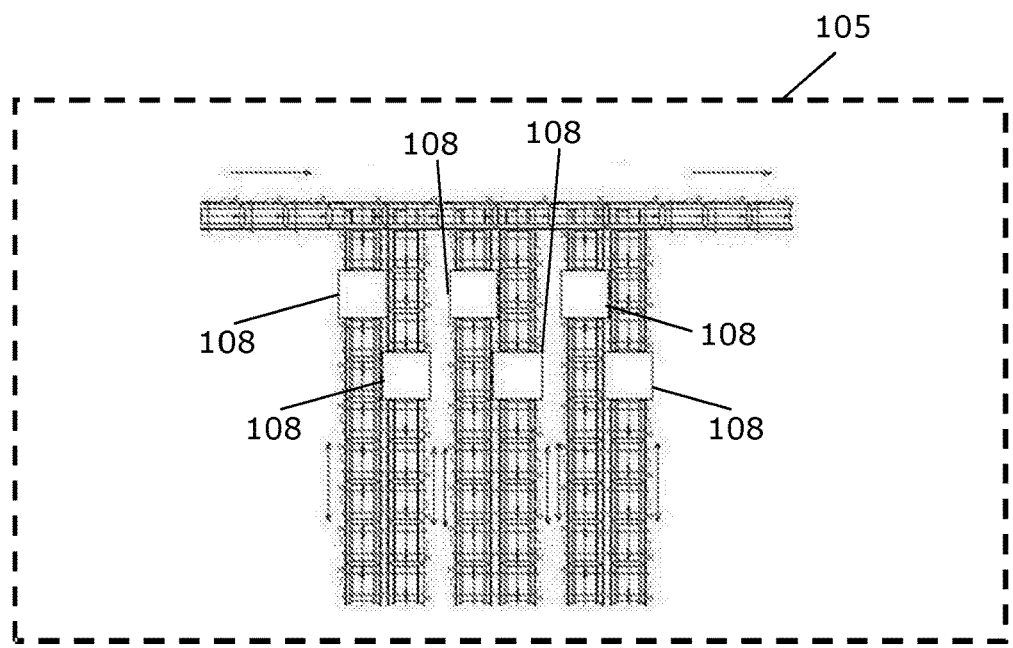

FIG. 21 illustrates a plurality of storage conveyor lines, six are shown, each storage line being provided with a tote station 108. In the shown embodiment the storage lines have a dead-end and each tote station is provided for positioning a number of totes above each other and for releasing totes on top of each other in the direction of the storage line, so that such stacks of totes can be stored after each other on the storage lane, and possibly can be released singly from the tote station in an opposite direction towards the conveyor line connecting the storage lines. Alternatively or additionally the configuration may comprise a connecting conveyor, also in the other end of the storage lines. It can be noticed that in the shown embodiments of configuration in FIGS. 21 and 22, the totes travel sideways in the storage lines, when compared to the connecting conveyor line.

Figure 22:
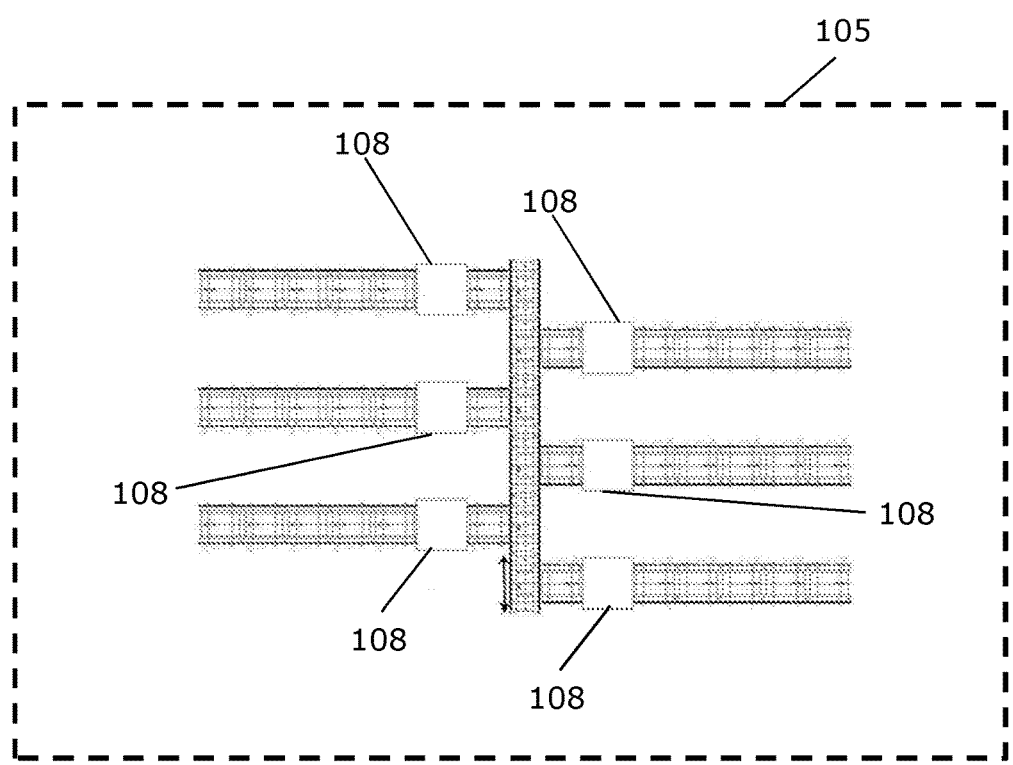

FIG. 22 illustrates a configuration where storage conveyor lanes or conveyor lines are provided both to a left and a right side of the connecting conveyor line. The same or similar remarks about transport directions etc. as submitted for FIG. 21 applies for the embodiment of a configuration 105 illustrated in FIG. 22. Each of the configurations 105 described herein, may be seen as examples of how to use the tote station 108 as a storage and/or for storing totes on top of each other in conveyor lines and/or for singling out single empty totes.

In short, it is herein disclosed that in order, e.g., to improve distribution of baggage in an airport, the disclosure regards a solution for distributing the baggage in baggage totes in an automated baggage distribution system 102. The solution comprises positioning two or more empty totes above each other, so that the two or more empty totes are supported by the tote station by support members 206, determining, by a control system, when either a single empty tote should be released from the tote station or two or more empty totes should be released from the tote station together and at once, and in response to the determination releasing single empty totes from the tote station 108 or releasing two or more empty totes on top of each other from the tote station. A lowermost 1604 of the two or more empty totes on top of each other supports one or more empty totes 1606 on top of it and the lowermost empty tote is, when released, supported by a support conveyor 204.

Although the present invention has been described in connection with preferred embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Reference signs are included in the claims however the inclusion of the reference signs is only for clarity reasons and should not be construed as limiting the scope of the claims.

The invention claimed is:

1. A method of distributing airport baggage, in airport baggage totes, in an automated baggage distribution system in an airport, said automated baggage distribution system comprising one or more conveyors, the method comprising:
   a) filling a tote with a piece of baggage at an induction,
   b) moving the tote with baggage in the baggage distribution system,
   c) emptying the tote from baggage at a discharge,
   d) determining, by a control system, which of the totes in the baggage distribution system are empty totes,
   e) positioning a first set of two or more empty totes above each other, so that the first set of two or more empty totes above each other are supported by a tote station comprising support members:
   f) releasing a single empty tote from the tote station to a first support conveyor of the automated distribution system, so that the single empty tote, when released, is supported by the first support conveyor of the automated baggage distribution system,
   g) moving the single empty tote in the baggage distribution system,
   h) positioning a second set of two or more empty totes above each other, so that the second set of two or more empty totes above each other are supported by said tote station comprising said support members,
i) releasing said second set of two or more empty totes from the tote station together and at once to the first support conveyor of the automated distribution system, so that the second set of two or more empty totes, when released, are supported by the first support conveyor,
j) moving the second set of two or more empty totes in the baggage distribution system, where the second set of two or more empty totes are on top of each other when released from the tote station, and so that, when released, a lowermost of the second set of two or more empty totes on top of each other supports one or more empty totes on top of it and so that the lowermost of the second set of two or more empty totes on top of each other is then supported by the first support conveyor; wherein the automated baggage distribution system is of a type where both empty and filled totes travel in or on said one or more conveyors of the baggage distribution system and, wherein said one or more conveyors both convey single empty totes, two or more totes on top of each other, and single filled totes.

2. The method according to claim 1, wherein step e) is performed such that a first empty tote of said first set of two or more empty totes is supported by the support members of the tote station at a level so that a second empty tote of said first set of two or more empty totes is able to be subsequently positioned below the first empty tote.

3. The method according to claim 2, wherein step e) further includes that the first empty tote is then lowered and released from being supported by the support members and so as to be supported by the second empty tote and so that the first and second totes are then supported by the first support conveyor of the automated baggage distribution system.

4. The method according to claim 3, wherein step e) further includes that the second empty tote is then moved so that both the first and second empty totes are supported by the tote station.

5. The method according to claim 4, wherein the movement of the first and second empty totes comprises lifting the second empty tote.

6. The method according to claim 5, wherein lifting the second empty tote comprises lifting the second empty tote with said support members, which are each engaged at an engagement surface of the second empty tote.

7. The method according to claim 6, wherein engagement of the support members with the second empty tote comprises the support members moving into engagement with the second empty tote in a second direction, which second direction is comprised in a plane, which plane is perpendicular to gravity or substantially perpendicular to gravity.

8. The method according to claim 1, wherein said support members are for supporting or releasing at least one empty tote at the tote station and wherein at least one of step e) and step g) includes moving the two or more support members in a first direction parallel to gravity or substantially parallel to gravity and moving the two or more support members in a second direction, which second direction is perpendicular to the first direction or substantially perpendicular to the first direction.

9. The method according to claim 1, wherein at least one of step f) and step i) further includes disengagement of each of said support members with a surface of the single empty tote or a surface of a lowermost of the two or more empty totes when the single empty tote or the lowermost of the two or more empty totes is supported by the first support conveyor of the automated baggage distribution system.

10. The method according to claim 1, wherein the first support conveyor maintains its horizontal level in at least one of step e) and in step f).

11. The method according to claim 1, wherein the first support conveyor is used as support for one single tote or two or more empty totes on top of each other, during a period when a plurality of support members moves in a first direction, which first direction is parallel with gravity or substantially parallel with gravity.

12. The method according to claim 1, wherein the automated baggage distribution system, the totes and the tote station are provided so that either step e), f) or i) can be carried out at a rate of at least 750 totes/hour, at least 1000 totes/hour, or at least 1200 totes/hour.

13. The method according to claim 1, wherein one, two or three of steps a), b) and c) is/are carried out while moving the empty or filled tote at a speed of at least 0.75 m/s, at least 1 m/s, or at least 1.25 m/s.

14. The method according to claim 1, wherein the method further comprises that a tote and any baggage on the tote is X-ray scanned in an X-ray scanning station while any baggage on the tote is carried by the tote through the X-ray station by the automated baggage distribution system.

15. The method according to claim 1, wherein the support members have a plurality of vertical axes, about which the support members rotate.

16. The method according to claim 15, wherein, after rotating the support members about the vertical axes, moving the support members along the vertical axes.

17. The method according to claim 1, further comprising rotating a plurality of support members about a plurality of axes, and after rotating the plurality of support members about the axes, moving the plurality of support members along their axes.

18. The method according to claim 1, the method further comprising, at said tote station, rotating the support members about a plurality of axes thereby positioning at least one of said support members in or out of a recess defined on an outer surface of a tote thereby engaging or disengaging the tote.

19. An automated baggage distribution system in an airport for distributing airport baggage in airport baggage totes, the system comprising:
  one or more inductions;
  one or more discharges;
  one or more tote stations;
  a control system;
  one or more conveyors;
  wherein at least one tote station is configured to release a single empty tote, so that the single empty tote, when released, is supported by a support conveyor of the automated baggage distribution system, and the at least one tote station is further configured to release two or more empty totes from the tote station together and at once, so that the two or more empty totes, when released, are supported by the support conveyor, wherein the two or more empty totes are on top of each other when released from the tote station, and so that, when released, a lowermost of the two or more empty totes on top of each other supports one or more empty totes on top of it, wherein said totes each define a recess on an outer surface of the totes, and wherein said automated baggage distribution system is configured to carry out a method comprising:

a) filling a tote with baggage at the induction,
b) moving the tote with baggage in the baggage distribution system,
c) emptying the tote from baggage at a discharge,
d) determining, by a control system, which of the totes in the baggage distribution system are empty totes,
e) positioning a first set of two or more empty totes above each other, so that the first set of two or more empty totes above each other are supported by a tote station comprising support members,
f) releasing a single empty tote from the tote station to a first support conveyor of the automated distribution system, so that the single empty tote, when released, is supported by the first support conveyor of the automated baggage distribution system,
g) moving the single empty tote in the baggage distribution system;
h) positioning a second set of two or more empty totes above each other, so that the second set of two or more empty totes above each other are supported by said tote station comprising said support members
i) releasing said second set of two or more empty totes from the tote station together and at once to the first support conveyor of the automated distribution system, so that the second set of two or more empty totes, when released, are supported by the first support conveyor,
j) moving the second set of two or more empty totes in the baggage distribution system, where the second set of two or more empty totes are on top of each other when released from the tote station, and so that, when released, a lowermost of the second set of two or more empty totes on top of each other supports one or more empty totes on top of it and so that the lowermost of the second set of two or more empty totes on top of each other is then supported by the first support conveyor;
wherein where both empty and filled totes travel in or on said one or more conveyors of the baggage distribution system and, wherein said one or more conveyors both convey single empty totes, two or more totes on top of each other and single filled totes.

* * * * *